United States Patent
Gormican et al.

(10) Patent No.: US 11,391,312 B2
(45) Date of Patent: *Jul. 19, 2022

(54) METHOD FOR CREATING A HIGH TENSILE STRENGTH JOINT FOR CONNECTING RODS AND FITTINGS

(71) Applicant: Megalex Joint, LLC, Houston, TX (US)

(72) Inventors: James P Gormican, Coronado, CA (US); Mitchell Hale, Houston, TX (US); Keith Loss, San Diego, CA (US); Tobias R. Panek, Ramona, CA (US)

(73) Assignee: MEGALEX JOINT, LLC, Houston, TX (US)

( * ) Notice: Subject to any disclaimer, the term of this patent is extended or adjusted under 35 U.S.C. 154(b) by 684 days.

This patent is subject to a terminal disclaimer.

(21) Appl. No.: 16/193,657

(22) Filed: Nov. 16, 2018

(65) Prior Publication Data

US 2019/0085884 A1    Mar. 21, 2019

Related U.S. Application Data

(63) Continuation-in-part of application No. 13/526,782, filed on Jun. 19, 2012, now Pat. No. 10,132,343, and
(Continued)

(51) Int. Cl.
*F16B 7/02* (2006.01)
*E21B 17/02* (2006.01)
*E21B 17/042* (2006.01)

(52) U.S. Cl.
CPC .............. *F16B 7/025* (2013.01); *E21B 17/02* (2013.01); *E21B 17/042* (2013.01)

(58) Field of Classification Search
CPC .. F16B 7/025; F16B 11/008; Y10T 403/4908; Y10T 403/4924; E21B 17/02
See application file for complete search history.

(56) References Cited

U.S. PATENT DOCUMENTS

| 462,601 | A | * | 11/1891 | Thines | .................. | F16B 13/066 |
|---|---|---|---|---|---|---|
| | | | | | | 411/53 |
| 614,944 | A | * | 11/1898 | Gaylor | .................. | B62K 21/18 |
| | | | | | | 403/233 |

(Continued)

FOREIGN PATENT DOCUMENTS

DE    102005008192 A1 *  8/2006  ............ F16B 11/008

*Primary Examiner* — Matthew R McMahon
(74) *Attorney, Agent, or Firm* — Myers Andras Ashman Bisol LLP; Joseph C. Andras

(57) ABSTRACT

A joint exhibits high tensile strength. The joint includes a solid rod having a slit or opening into which a wedge is inserted. The rod and wedge are inserted into a fitting. Only a small amount of adhesive material is applied between the fitting and the rod. The adhesive material may be blended with non-adhesive, non-compressible "beads" that have a preferred diameter in order to insure that the desired adhesive thickness is achieved between the fitting and the rod. The internal surface of the fitting has a contour which continuously and nonlinearly varies with distance along the fitting. The wedge has a dimension having a similar contour. The shape of the contour can be described by a polynomial of order two or higher. The joint can be used to construct a sucker rod for an oil well, or it can be used in other applications. The joint can support high tensile loads, over long distances, while occupying a very narrow tubing bore.

18 Claims, 6 Drawing Sheets

Related U.S. Application Data a continuation-in-part of application No. 16/163,489, filed on Oct. 17, 2018, now Pat. No. 10,895,116.

(56) References Cited

U.S. PATENT DOCUMENTS

| | | | | |
|---|---|---|---|---|
| 2,686,963 A * | 8/1954 | Freyssinet | | E04C 5/122 264/249 |
| 2,874,937 A * | 2/1959 | Higgins | | E21B 17/00 403/265 |
| 3,625,012 A * | 12/1971 | Thorburn | | E02D 5/523 405/252 |
| 3,672,712 A | 6/1972 | Davis | | |
| 3,739,457 A * | 6/1973 | Davis | | B29C 66/1122 29/460 |
| 3,787,131 A * | 1/1974 | Reachek | | E04G 7/22 403/234 |
| 4,184,784 A * | 1/1980 | Killian | | F16G 11/05 24/122.6 |
| 4,205,926 A | 6/1980 | Carlson | | |
| 4,369,003 A * | 1/1983 | Brandstetter | | E21D 21/008 405/259.3 |
| 4,430,018 A | 2/1984 | Fischer | | |
| 4,526,492 A * | 7/1985 | Preis | | E04C 5/125 403/268 |
| 4,692,055 A * | 9/1987 | Seymour | | F16B 7/0446 403/190 |
| 4,740,101 A | 4/1988 | Allen | | |
| 4,793,042 A * | 12/1988 | Easter | | B21B 27/03 29/895.212 |
| 5,061,826 A * | 10/1991 | MacCulloch | | H02G 1/10 174/70 S |
| 5,415,490 A * | 5/1995 | Flory | | F16G 11/05 403/267 |
| 6,075,210 A * | 6/2000 | Yamanaka | | H01B 17/325 174/179 |
| 6,193,431 B1 | 2/2001 | Rutledge | | |
| 7,770,265 B2 | 8/2010 | Campbell | | |
| 8,388,796 B2 * | 3/2013 | Kobayashi | | F16L 13/103 156/294 |
| 10,697,488 B2 * | 6/2020 | Ummenhofer | | B29C 65/4805 |
| 2005/0248156 A1 * | 11/2005 | Hsieh | | F16L 25/12 403/367 |
| 2009/0074538 A1 * | 3/2009 | Richie | | F16B 13/065 411/516 |
| 2015/0252824 A1 * | 9/2015 | Benthien | | F16M 11/22 248/205.3 |

* cited by examiner

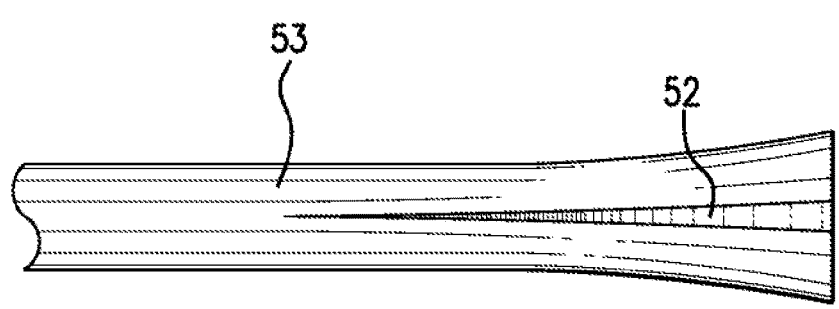
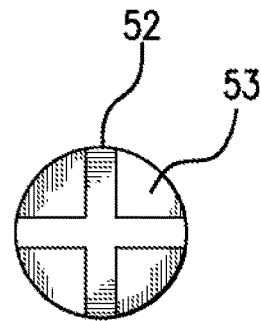
FIG. 3　　　　　　FIG. 4
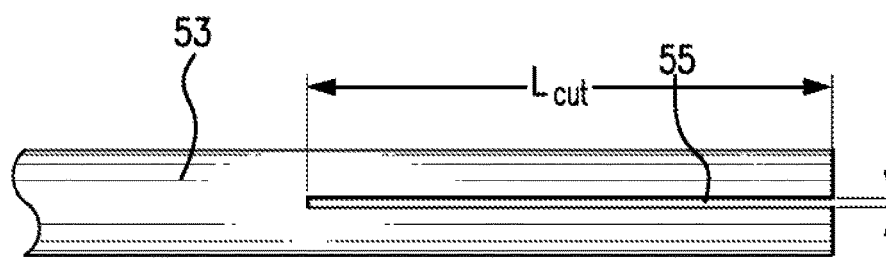
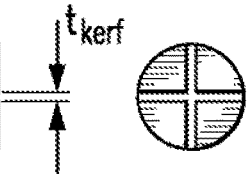
FIG. 3a　　　　　　FIG. 4a

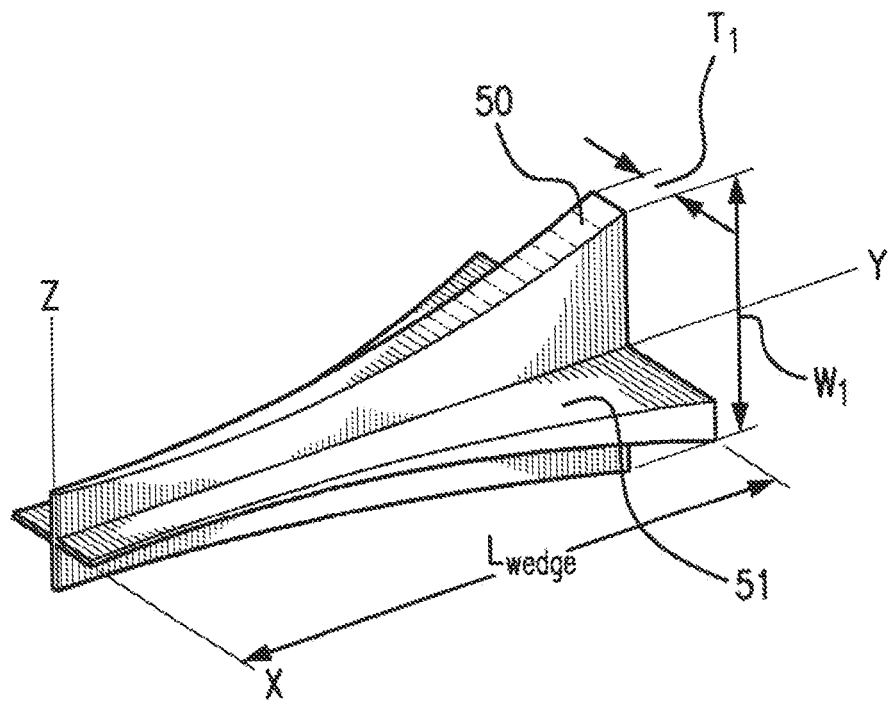
FIG. 5
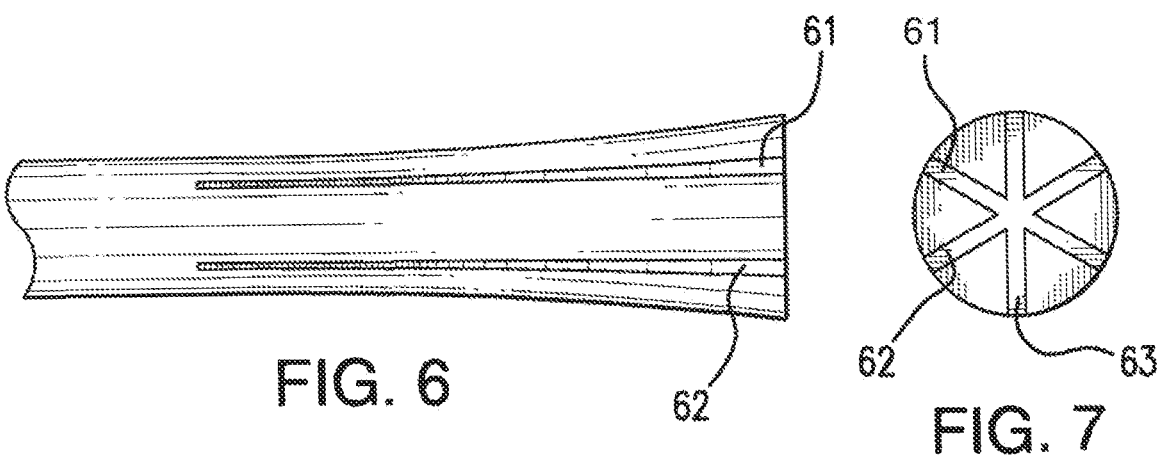
FIG. 6
FIG. 7

METHOD FOR CREATING A HIGH TENSILE STRENGTH JOINT FOR CONNECTING RODS AND FITTINGS

This application is a continuation-in-part of application Ser. No. 13/526,782, filed Jun. 19, 2012, and application Ser. No. 16/163,489, filed Oct. 17, 2018.

BACKGROUND OF THE INVENTION

1. Field of the Invention

This invention relates generally to connectors and fixtures and, more specifically, to a High Tensile Strength Joint for Connecting Rods and Fittings.

2. Description of Related Art

The present invention comprises a joint which connects a rod and a fitting, wherein the rod and fitting are subjected to high-tension loads. The invention is especially useful in constructing a sucker rod for oil wells. The invention may be used, however, in many other applications, such as in pre-stressed concrete, and in tension members for bridges.

A sucker rod is a long rod formed of a plurality of sections, capable of connecting a pump, located at the bottom of an oil well, with a lifting device, or pump jack, located at the surface. Each section may include a rod portion and a fitting portion, each rod being inserted into a fitting. In practice, a sucker rod comprises a long chain of rods and fittings and couplings. Because some wells may be deeper than 16,000 feet, the sucker rod must have very high tensile strength, so that the rod does not break under its own weight plus that of the fluid, as it is pulled up by the pump jack, and pulled down by gravity. The problem of designing a sucker rod having the necessary tensile strength is made more difficult by the fact that the rod typically must fit within a tubing of relatively small diameter.

Various sucker rods have been proposed in the prior art, as exemplified by U.S. Pat. Nos. 4,205,926, 4,430,018, and 6,193,431. The disclosures of these patents are hereby incorporated by reference.

While the above-cited patents provide useful solutions, the patented devices have disadvantages. Among other things, some of the prior art uses rods that are made of stranded wire. A stranded rod, by definition, has less than optimal tensile strength, because the strands do not occupy the entire cross-sectional area of the rod, and the filaments are not aligned exactly parallel to the rod axis.

In general, the prior art has not developed a sucker rod having sufficient tensile strength, while occupying a minimal cross-sectional area. There is still a need for a sucker rod which is stronger than sucker rods of the prior art, which incorporates advanced materials that are lighter than metal, and which still fits within a narrow tubing bore.

The present invention provides a joint which exhibits very high tensile strength, while minimizing the cross-sectional area required. The joint of the present invention can therefore be used to construct longer, lighter sucker rods which can still lift a useful payload of fluid. It can also be used in many other applications requiring the assembly of rods capable of carrying large tensile loads. However, the joint of the present invention is not intended to bear significant compression loads.

SUMMARY OF THE INVENTION

In light of the aforementioned problems associated with the prior systems and methods, it is an object of the present invention to provide a High Tensile Strength Joint for Connecting Rods and Fittings.

The present invention comprises a joint which includes a solid rod inserted into a fitting. The rod is preferably a carbon or graphite composite, and the fitting is preferably made of steel. The rod has an opening or slit at its ends, into which a wedge is inserted. The internal diameter of the fitting varies smoothly and nonlinearly with distance along the fitting. At the narrow end of the wedge, i.e. the end of the slit where the wedge terminates, the internal contour of the fitting becomes parallel to the axis of the rod. The wedge has a dimension which also varies smoothly and nonlinearly with distance. Preferably, the variation of the dimension of the wedge is substantially the same as that of the internal diameter of the fitting. That is, the contour of the fitting is substantially the same as the contour of a portion of the wedge. In a preferred embodiment, this contour can be described by a polynomial function having an order of at least two, such that the contour becomes parallel to the axis of the rod at the narrow end of the wedge where it terminates.

In a preferred embodiment, the wedge has a cruciform shape. In a more general case, the preferred wedge includes at least two mutually non-parallel vanes. However, the wedge could instead have only a single vane.

In assembling the joint, the wedge is prepared by forming at least one slit in the rod, so that the rod can accommodate the wedge. The wedge is then inserted into the rod, causing the rod to expand or swage outward. When the rod, with the wedge inserted, is inserted into the fitting, the joint occupies virtually all the space within the fitting, at all points where the rod and wedge are present.

The joint of the present invention exhibits very high strength under tension. The joint may also include a plug which is inserted into the fitting which prevents the rod from being dislodged with respect to the fitting in the presence of relatively small compressive loads.

The joint is particularly suited for use in constructing sucker rods for oil wells, because the joint can accommodate very high tensile loads, while occupying a long and narrow tubing bore. The joint can also be used in applications other than in oil production.

The invention therefore has the primary object of providing a joint which exhibits high tensile strength.

The invention has the further object of providing a joint which can be used to construct a long rod, wherein the rod has high tensile strength while fitting within a tubing bore of relatively small diameter.

The invention has the further object of providing a joint for use in a sucker rod for an oil well.

The invention has the further object of providing a joint which uses a solid rod, and which thereby takes full advantage of the available cross-section of the rod, providing a structure of high tensile strength.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 3 provides a side view of a swaged rod, with the fitting removed, used in the present invention, the rod having a cruciform wedge inserted therein;

FIG. 3a provides a side view of the rod used in the present invention, showing an opening or slit formed therein, before a wedge has been inserted;

FIG. 4 provides an end view of the rod and the cruciform wedge of FIG. 3;

FIG. 4a provides an end view of the slitted rod of FIG. 3a;

FIG. 5 provides a perspective view of the cruciform wedge used in the present invention;

FIG. 6 provides a side view of a swaged rod, with the fitting removed, used in the present invention, the rod having a multiply-vaned wedge inserted therein;

FIG. 7 provides an end view of the rod and the multiply-vaned wedge of FIG. 6;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a High Tensile Strength Joint for Connecting Rods and Fittings.

Figure 1:
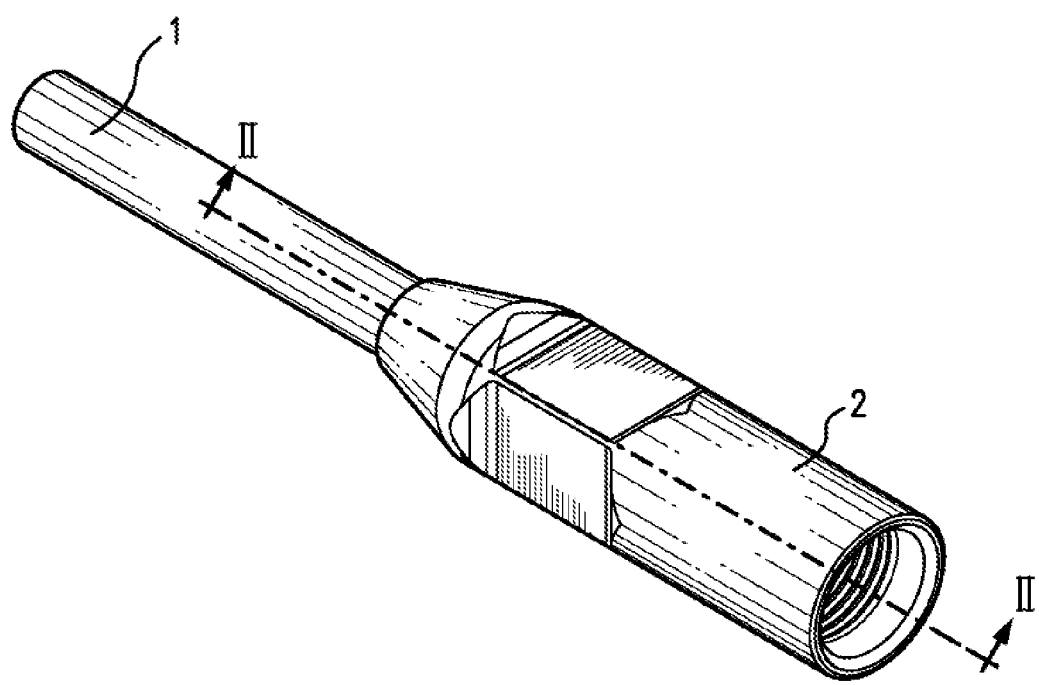
FIG. 1 provides a perspective view of the joint of the present invention, showing a rod inserted into a fitting.

The present invention can best be understood by initial consideration of FIG. 1.[1] FIG. 1 provides a perspective view showing the joint of the present invention. The joint includes rod 1 inserted into fitting 2.

[1] As used throughout this disclosure, element numbers enclosed in square brackets [ ] indicates that the referenced element is not shown in the instant drawing figure, but rather is displayed elsewhere in another drawing figure.

In the preferred embodiment, the rod is formed of a composite including graphite, or other carbon, and an organic resin. The graphite exists in the form of tightly-packed fibers or filaments, which maintain their identities as having individual, small diameters. The organic resin is similar to an adhesive, and binds the fibers effectively into a single, solid rod.

In the preferred embodiment, the fitting is a single piece of machined metal, preferably formed of high-strength steel. The steel forming the fitting preferably has a yield strength in the range of 110 ksi-140 ksi. The material must not be too brittle, and must allow reasonable elongation (of the order of greater than about 15%) before failure. The steel may be selected according to its corrosion resistance properties, if desired.

Although the invention will be described in terms of a graphite composite rod inserted into a steel fitting, it should be understood that the invention should not be deemed limited to particular materials. It is possible that the rod could be some other material, even metal. It is also possible that the fitting could be constructed of something other than steel, if such material has sufficient strength.

Figure 2:
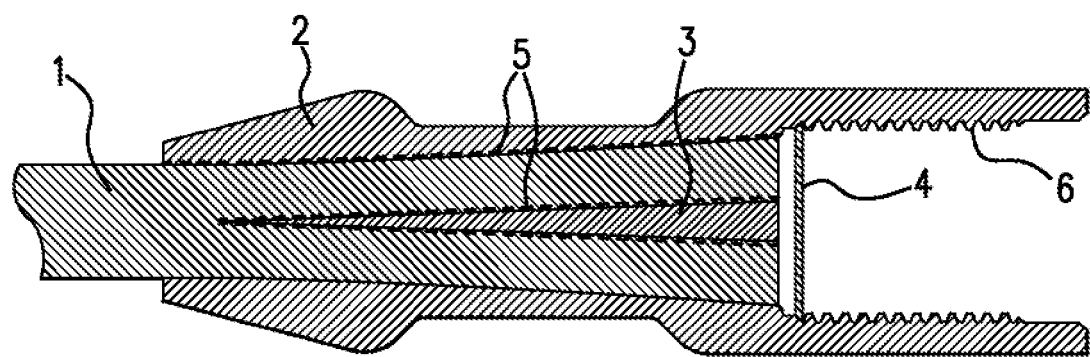
FIG. 2 provides a cross-sectional view of the joint of the present invention, taken along the line II-II of FIG. 1.

FIG. 2 provides a cross-sectional view of the joint of the present invention, taken along the line II-II of FIG. 1. The line II-II is somewhat off-center, as will be apparent later in this description.

FIG. 2 shows solid rod 1 inserted within fitting 2. The rod includes a slit which accommodates a wedge 3. The wedge is inserted within the slit, and occupies substantially all of the space defined by the slit. The wedge therefore causes the rod to be swaged outward. An adhesive 5, indicated symbolically by dashed lines in FIG. 2, is provided between the outer surface of the rod and the inner surface of the fitting, as well as between the wedge and slit surfaces of the rod.

A plug 4, if included, is screwed into the fitting, with the aid of threads 6. The plug provides resistance to small, incidental compressive forces. That is, if the assembly of rods and fittings is momentarily compressed, the plug prevents the rod from becoming dislodged and pushing into the open, larger diameter end of the fitting. The plug is preferably made of metal.

It is an important aspect of the present invention that the wedge be smoothly curved, and that the inside surface of the fitting be smoothly curved. Also, the curvature of the wedge has substantially the same shape as the curvature of the interior surface of the fitting.

More precisely, the internal diameter of the fitting varies smoothly and nonlinearly with distance along the fitting. And the wedge has a dimension which similarly varies smoothly and nonlinearly with distance along the wedge.

Thus, as shown in FIG. 2, the fitting has a threaded region, at and to the right of the plug 4, and a contoured region, to the left of the plug, in which the inside surface of the fitting is contoured as described above.

In one preferred embodiment, the variation of the internal diameter of the fitting (as well as the thickness and the width of the wedge) is a cubic spline, defined as follows:

$$D = D_{throat} + 2 \times R_{delta} \times [1 - 1.5(L-z)/L + (L-z)^3/2L^3] \quad (1)$$

where D is the internal diameter of the fitting;
- $D_{throat}$ the diameter of the rod plus a clearance (typically about 0.01 inches);
- L is the length of the contoured internal diameter;
- $R_{delta}$ is $(D_{max} - D_{throat})/2$;
- $D_{max}$ is the desired maximum internal diameter of the fitting at the point where the width of the wedge is at its maximum; and
- z is the distance from the start of the contoured shape of the internal diameter.

Thus, $R_{delta}$ is the increase in the internal radius of the fitting caused by the swaging effect of the wedge.

The above equation shows that at the start of the wedge, where z=0, the diameter is $D = D_{throat}$. At the right-hand edge of the wedge, where z=L, the diameter is $D = D_{throat} + 2R_{delta} = D_{max}$.

Note also that the slope of the above-defined contour is zero at z=0. That is, the slope of the contour is calculated as the first derivative of D (equation (1)), as a function of z, and evaluated for z=0. This is another way of saying that the slope of the contour equals the slope of the rod, at the narrow (unswaged) end of the rod, and both such slopes are zero.

The thickness of the wedge, as a function of y, which is defined by FIG. 5, is given in the following Equation (2). In Equation (2), the axes are different from those implied in Equation (1).

$$T_1(y) = t_0 + (t_{max} - t_0)[1 - 1.5(L_{wedge} - y)/L_{wedge} + (L_{wedge} - y)^3/2L_{wedge}^3] \quad (2)$$

where:
- $t_0$ = thickness of wedge at the thin end = $t_{kerf} - 2t_{bondline}$
- $t_{kerf}$ = nominal thickness of the kerf (as illustrated in FIG. 3a)
- $t_{bondline}$ = nominal thickness of the bondline (about 0.005 inches)

$t_{max}$=maximum thickness of the wedge=0.9 $(D_{max}-D_{throat})-4t_{bondline}$ $L_{wedge}$=0.99 (L) (99% of the length of the cut, $L_{cut}$) (see FIG. 3 a)

$D_{max}$ is the same as defined for Equation (1)

$D_{throat}$ is the same as defined for Equation (1)

y=distance from the thin end of the wedge piece.

Note that Equation (2) is the same for $T_2(y)$, which is the thickness of the other vane of the wedge, as shown in FIG. 5.

The width of the wedge, as defined in FIG. 5, is given by Equation (3), as follows:

$$W_1(y)=W_0+(W_{max}-W_0)[1-1.5(L_{wedge}-y)/L_{wedge}+(L_{wedge}-y)^3/2L_{wedge}^3] \quad (3)$$

where:

$W_0$=width of wedge at the narrow end (about 0.98 $(D_{throat}))-2t_{bondline})$ $W_{max}$=maximum width of wedge at wide end (about 0.95 $(D_{max})-2t_{bondline})$ $t_{bondline}$=nominal thickness of the bondline (about 0.005 inches)

$L_{wedge}$=0.99 (L) (99% of length of the cut, $L_{cut}$) (see FIG. 3 a)

$D_{max}$=the desired maximum diameter at the maximum width of the wedge $D_{throat}$=the diameter of the rod plus a clearance (typical clearance being about 0.01 inches)

y=distance from the thin end of the wedge piece

Similarly to Equation (2), Equation (3) is the same for $W_2(y)$, which is the thickness of the other, relatively perpendicular vane of the wedge, shown in FIG. 5.

Thus, at the right-hand edge of the wedge ($y=L_{wedge}$), the wedge thickness is $t_{max}$, and the wedge width is $W_{max}$.

At the left-hand edge of the wedge (y=0), Equation (2) yields a value of $t_0$ for the wedge thickness, and Equation (3) yields a value of $W_0$ for the wedge width. Thus, Equations (2) and (3) account for the fact that the wedge thickness, in practice, has a small non-zero value at its thin edge.

At the point where the thickness of the wedge becomes less than a certain small value, the wedge can be trimmed, so that the measured thickness becomes the starting thickness of the wedge.

In the equations shown above, it is seen that the internal diameter of the fitting, and the thickness of the wedge, and the width of the wedge, all vary according to a third-order polynomial function of distance along the axis of the joint.

The above equations represent only one of many possible embodiments. In the general case, the internal diameter of the fitting, and the thickness and width of the wedge, must vary smoothly and nonlinearly with distance. Also, the contour or shape of the inside of the fitting should be the same as the contour of the thickness of the wedge, which should be the same as the variation of the width of the wedge.

The desired maximum inner bore diameter of the fitting corresponding to the end of the wedge (the right-hand side of the wedge in FIG. 2) is selected according to the following criteria:

1) the cross-sectional area of the fitting is at least twice the cross-sectional area of the rod at any point along the fitting which is occupied by the wedge; and 2) the maximum diameter is greater than about 1.3 times the diameter of the rod and less than about 1.5 times the diameter of the rod.

Also, in practice, the maximum width of the wedge is not quite equal to the full diameter of the fitting.

The wedge should be relatively short and compact. The length of the wedge is preferably less than five times the diameter of the rod, allowing for a shorter fitting that is less than 5.3 times the diameter of the rod.

In general, substantially all of the space within the fitting, at all points where the rod and wedge are present, is occupied by the components of the invention, namely the wedge, the rod, and to a minimal extent, the adhesive. There is virtually no "air" or unoccupied space within the fitting, where the rod is present.

The wedge preferably has a cruciform shape. FIGS. 3-5 illustrate this feature. The cruciform wedge is illustrated in the perspective view of FIG. 5, which shows vertical vane 50 and horizontal vane 51. The vanes can be machined as a unitary part, or they could be separately constructed and suitably joined. Both vanes have a thickness which increases from left to right, as shown in the drawing. The variation in thickness of each vane could be as given in Equation (2), discussed above. If Equation (2) is used to define the variation of the thickness of one of the vanes, it should be used for both vanes. In general, all vanes should have the same variation of thickness with distance along the wedge.

FIG. 3 shows the wedge 52 inserted within the rod 53. The end view of FIG. 4 further illustrates the cruciform structure of the wedge, when it is embedded in the rod 53.

FIG. 3a shows the rod 53 having an opening or slit 55 formed therein. FIG. 3a represents the state of the rod before a wedge has been inserted. The figure also indicates the definition of the quantity $t_{kerf}$, which is the thickness of the kerf, which is the material removed from the rod in forming the slit. FIG. 4a shows the corresponding end view of the rod of FIG. 3a.

The wedge could have greater numbers of vanes. FIGS. 6 and 7 illustrate an example in which the wedge comprises three vanes. The side view of FIG. 6 shows two vanes 61, 62, and the end view shows all three vanes 61, 62 and 63.

In the preferred embodiment, the wedge has at least two vanes. It is also possible for the wedge to have only one vane. In this case, the swaging effect would occur in only one direction. This arrangement would result in a weaker rod assembly, but might be useful in certain applications.

In the above-described example, the internal diameter of the fitting, and the outer diameter of the rod, and the thickness of the wedge, vary according to the cube of the distance along the fitting. This curvature need not be exactly as shown in the example. Rather, it is a feature of the invention that the curvature be described by a polynomial equation having an order of at least two. Such equation may represent the deflected shape of a cantilever beam under an end load. Thus, the diameter of the fitting could vary with the square or the cube, or some higher power, of the distance.

It is important that the above-described curvature be smooth and continuous, and that the curvature continue along substantially all of the distance along which the rod is inserted into the fitting. If instead the interior diameter of the fitting varied linearly with distance (i.e. defining a conic shape), stress concentrations would form at kinks in the fitting, causing weakening and eventual failure of the joint. The curvature may be consistent with the deflected shape of a beam under distributed loads.

In making the joint of the present invention, a plurality of slits is formed in the rod, an adhesive is inserted in the slits, and applied to the wedges, and the wedges are then inserted into the slits. The length of each slit should correspond to the length of the wedge to be inserted. In forming the slits, some of the material of the rod is removed, this material being known as "kerf". When the wedges are fully inserted, substantially all of the space within the rod is filled. More particularly, the wedges, when inserted, substantially conform to the contour of the adjacent material of the rod, to insure that virtually all of the space is filled. The slits are very small relative to the diameter of the rod to not significantly weaken the rod.

The adhesive fills any small spaces or gaps that might remain between the wedges and the rod, or between the fitting and the rod. The adhesive also prevents the wedge from being forced out. It is possible to avoid the use of an adhesive for this purpose if one has enough friction between surfaces to hold the wedge in place.

In the preferred embodiment, the rod is a pultruded solid composite, and is compatible with high-temperature epoxy resins. The choice of a solid composite rod makes it feasible to use high-strength carbon or graphite fibers. Since the carbon or graphite fibers fill substantially all of the cross-sectional area of the rod (until the wedge has been inserted), the present invention takes advantage of the full cross-section, and results in a stronger rod, for a given cross-sectional area. That is, the joint can accommodate loads of more than three times those of a conventional joint having the same size, such as the joint shown in U.S. Pat. No. 4,205,926.

The use of a solid rod contrasts with the use of stranded cables of the prior art. Cables inherently have spaces between strands, or between groups of strands, resulting in not all of the cross-sectional area being used in supporting a load.

The high strength of the rod makes it possible to design the joint such that the rod and fitting are of relatively small diameters. Thus, the rod and fitting are more likely to be successfully operated within small diameter tubes, such as the bore of an oil well.

However, the invention is not limited to a rod or fitting of any particular diameter. What is important is that the rod initially be of solid construction, and that it initially have a constant diameter. The invention can be scaled such that larger and thicker rods and fittings could be used.

Although the rod has been described as graphite, or as a composite of graphite and resin, the rod may be made of another material, such as metal or fiberglass. The threaded end of the fitting allows multiple segments to be connected using a standard coupling technique.

The joint of the present invention is intended to transfer large loads in tension, but not compressive loads. The plug caps off the end of the rod, and will withstand relatively small, incidental compression loads that might otherwise cause the rod to unseat from the fitting.

The present invention is not limited to use with sucker rods in the oil industry. It could be used in structural applications such as tension rods for pre-stressing of concrete and other materials which are strong in compression. It could be used in making guy wires or cables. It could also be used for pre-stressed concrete structures and/or in making suspension supports, such as are used for bridges.

The invention can be modified in various ways. As indicated above, the number of vanes of the wedge can be varied. The materials used for the wedge, the rod, and the fitting can be changed, consistent with the requirements of stiffness. The exact contour of the relevant surfaces of the fitting and wedge can be varied, as long as the contour is smooth and nonlinear.

Figure 8A:
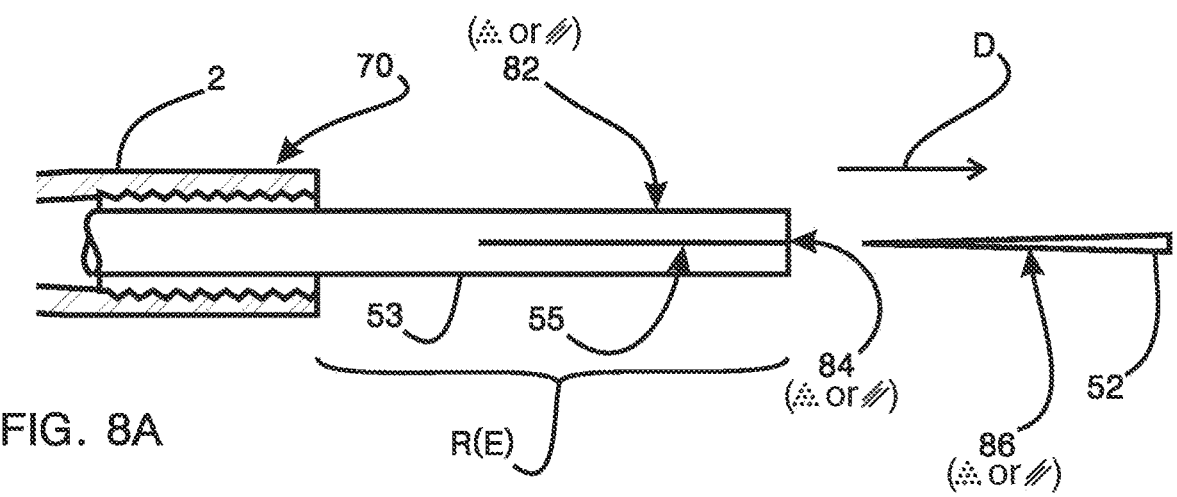
FIGS. 8A, 8B, 8C and 8D sequentially depict the steps of the preferred method of the present invention.

FIGS. 8A, 8B, 8C and 8D sequentially depict the steps of the preferred method of the present invention. In FIG. 8A, the fitting 2 has been positioned within the chuck of the press machine used to assemble the joint of the present invention. The rod 53 has been slid into the fitting 2 in direction "D" until the pre-determined end portion R(E) of the rod 53 is exposed beyond the threaded end 70 of the fitting 2. This distance R(E) can be expressed as either a dimension, or as a length that is determined as a function of the diameter of the rod 53. The optimum exposed portion R(E) should be approximately 125 percent of the length of the slit 55 (and wedge 52). As such, for a 4-inch long slit/wedge, the optimum exposed portion R(E) is five (5) inches.

Prior to inserting the wedge 52 into the slit 55, the outer surfaces of the wedge(s) 52, inner surface of the fitting 2, and outer surface of the rod 53 are all coated with a thin layer of adhesive 82, 84, 86. This adhesive has been observed to resist relative movement between the wedges, rod and fitting once the fitting has been pressed together (i.e. as depicted in FIG. 8D).

When applying the adhesive 82, 84, 86, as suggested by the small dots in parentheses adjacent to reference numbers 82, 84, and 86, a small volume fraction (<5%) of small, hard spheres (herein termed "bonding beads") made from glass or metal are added to the adhesive to maintain a minimum bond line thickness of approximately 0.007" to prevent the adhesive from being scraped off during the insertion process. Alternatively, small diameter glass filaments or metal wires, as suggested by the small parallel lines in parentheses adjacent to reference numbers 82, 84, and 86, could be aligned lengthwise in the adhesive to serve the same function of ensuring the minimum bond line thickness.

Figure 8B:
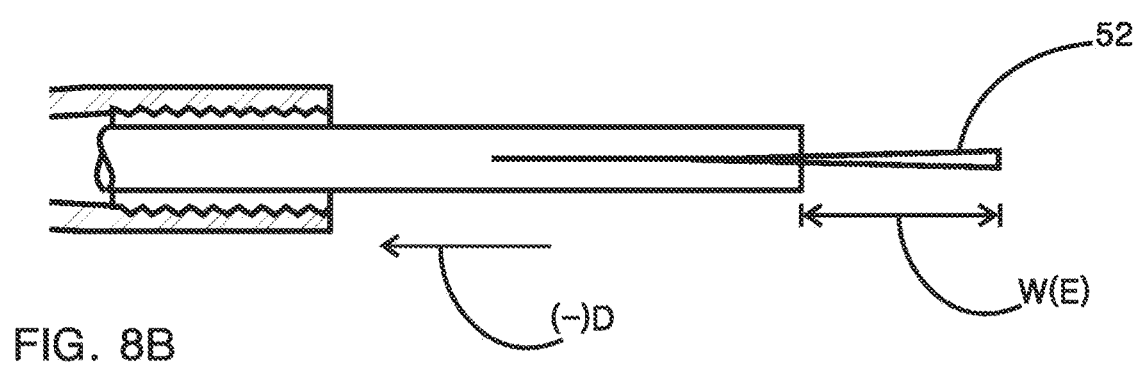

Next, as depicted in FIG. 8B, the wedge 52 (or cruciform pair of wedges as depicted in FIG. 4) is/are partially inserted into the slit 55 (or slits) until the pre-determined end portion W(E) remains exposed beyond the face 72 of the rod 53. This wedge exposed distance W(E) can be expressed as either a dimension, or as a length that is determined as a function of the diameter of the rod 53. The optimum exposed portion W(E) should be approximately ⅔rds of the length of the wedge 52 (and slit 55). As such, for a 4-inch long slit/wedge, the optimum exposed portion W(E) is 2⅔rds inches.

Figure 8C:
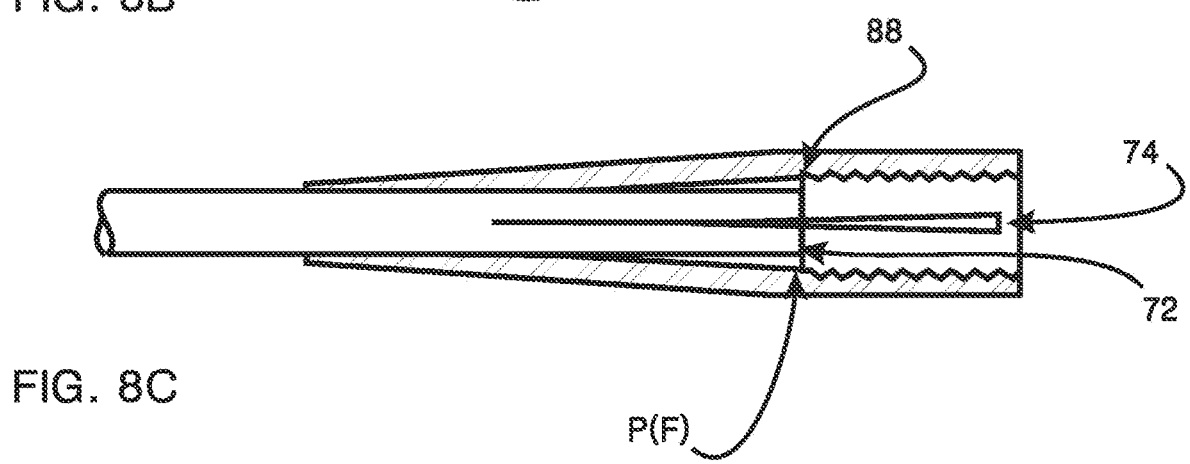
Figure 8D:
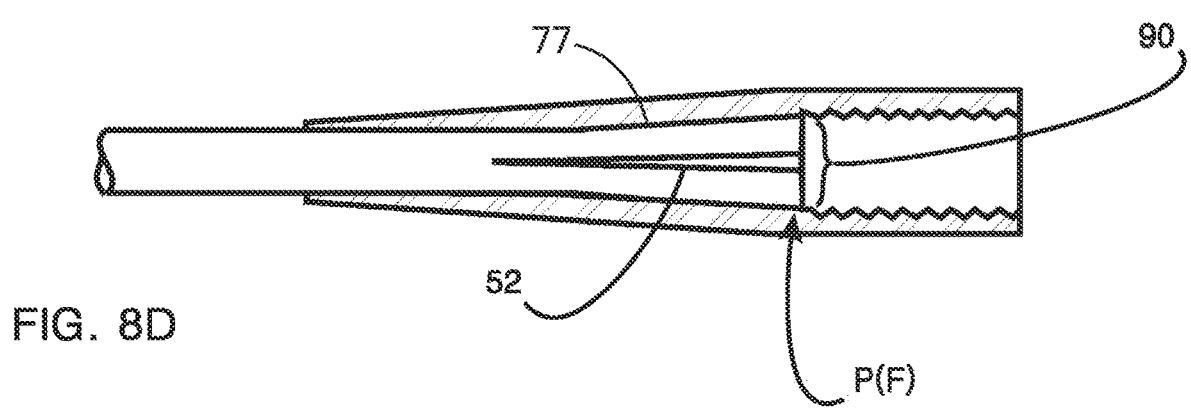

In FIG. 8C, the wedge(s) face 74 and rod face 72 are being pulled in direction −D relative to the chuck of the joint press machine until the face 72 of the rod 53 extends into the threaded portion 70 of the fitting 2 by a distance that is approximately equal to "pre-press exposed portion" W(E) and reaches non-threaded position 88. It should be understood that typically this position 88 is reached (transitioning from the position of FIG. 8B) by pulling on the rod 53 in direction −D (rather than by handling the wedge(s) 52). This distance W(E) can be expressed as either a dimension, or as a length that is determined as a function of the diameter of the rod 53. The optimum pre-press exposed portion W(E) should be approximately ⅔rds of the length of the wedge 52 (and slit 55). As such, as already noted, for a 4-inch long slit/wedge, the optimum exposed portion W(E) is 2⅔rds inches.

Finally, FIG. 8D depicts the final positions of the wedges, rod and fitting after the joint has been pressed in direction −D by the press machine. After pressing, the rod 53 remains in the final "rod seated position" P(F) relative to the end of the tapered portion 77 of the fitting 2, and the wedge(s) is/are in "wedge seated position" 90 with the end of the wedge face 74 in the same plane as the end of the rod face 72.

The registration or positioning of the wedge(s) 52 relative to the rod 53, and the rod 53 relative to the fitting 2 prior to the components being pressed together has been found to be extremely critical in the formation of a strong fitting. When positioned as detailed above, the press device used to form the final joint will press down (in a single pressing operation) on the wedge face 74 and the rod face 72 so that the wedge 52 arrives at its optimum position relative to the rod 53 just as the rod 53 reaches its final position relative to the fitting 2. These final positions were determined after substantial testing to provide the strongest joint between the rod 53 and the fitting 2 ever before assembled. If we now turn to FIG. 9, we can examine additional features of the steps depicted in FIGS. 8A-8D.

Figure 9:
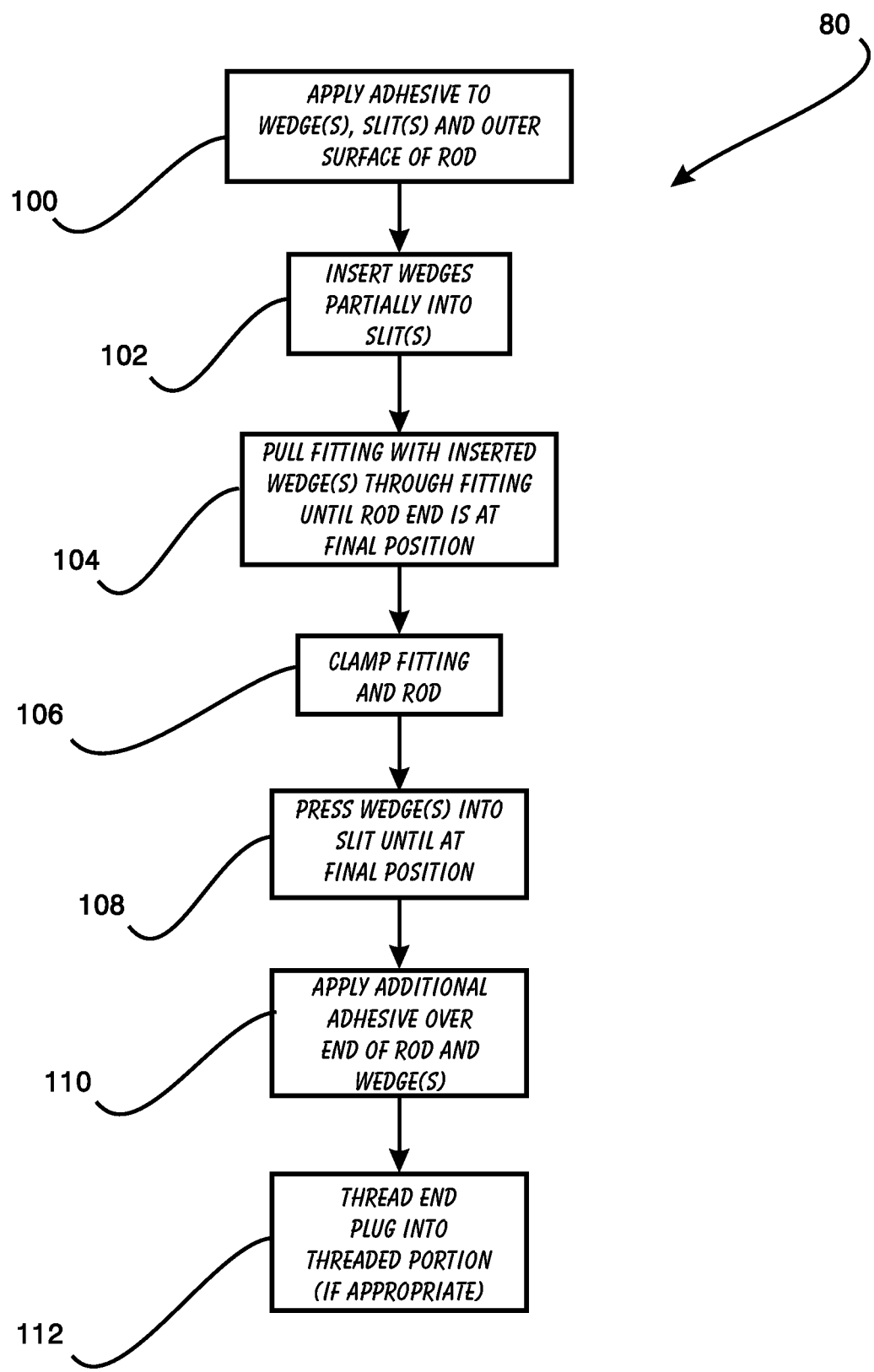
FIG. 9 is a flowchart showing the steps of the preferred method of the present invention.

FIG. 9 is a flowchart showing the steps of the preferred method 80 of the present invention. It should be understood that the fitting [2] has first been inserted into, and secured within the chuck of the joint press machine. The rod [53] is inserted into the fitting [2] until the end is exposed by not less than dimension [R(E)] 100. Next (or at any time prior to step 104), adhesive (e.g. epoxy) and bonding beads are applied to the curved side face(s) of the wedge or wedges [52] 102.

Next, the wedge or wedges [52] are inserted into the slit(s) 55 formed in the end of the rod [52] until they are partially inserted 104 (i.e. until [W(E)]) is reached. Epoxy with bonding beads is then applied to the exposed end (portion [R(E)]) of the rod [53] 106, and the rod [53] is then slid into the fitting [2] until it reaches pre-press position [R(PE)].

Finally, the wedge(s) [52] are pressed until they are seated into slit(s) [55] in the rod [53], and the rod [53] is forced into the tapered section of the fitting [2] until it also reaches its seated position [P(F)]. The wedge(s) [52] will then also be in their seated position [P(F)]. The fitting is now completed and ready for attachment to (a) another fitting [2], or (b) another structure via a threaded rod threadedly engaging the threaded portion [75] of the fitting [2].

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A joint, comprising:
    a) a fitting formed of a single piece of metal, the fitting having an interior surface,
    b) a solid rod having an end which is inserted at least partly into the fitting,
    c) the rod having an opening, the opening being inside the rod and formed in said end, and
    d) a wedge being inserted into the opening of the rod, wherein the rod has an exterior surface which substantially conforms to the interior surface of the fitting, wherein there is not less than 0.007 inches between the interior surface of the fitting and the exterior surface of the rod, wherein the interior surface of the fitting has an internal diameter which varies smoothly and nonlinearly with distance along the fitting, wherein the wedge has a dimension which varies smoothly and nonlinearly with distance along the wedge, and wherein a variation of the dimension of the wedge with distance is substantially similar to a variation of the internal diameter of the fitting with distance, wherein an axial end of the wedge is substantially aligned with an axial end of the rod, and wherein the axial end of the rod is substantially aligned with an axial end of the portion of said interior surface of the fitting wherein the diameter varies smoothly and nonlinearly with distance.

2. The joint of claim 1, wherein the diameter of the fitting, and the dimension of the wedge, vary with at least a second power of the distance along the fitting or wedge, respectively.

3. The joint of claim 1, wherein the wedge is made of a material having high stiffness.

4. The joint of claim 1, wherein the fitting has a cross-sectional area and the rod has a cross-sectional area, and wherein the cross-sectional area of the fitting is at least twice the cross-sectional area of the rod.

5. The joint of claim 1, wherein the wedge has a cross-sectional shape which is cruciform.

6. The joint of claim 1, wherein the wedge includes at least two vanes which are non-parallel to each other.

7. The joint of claim 1, wherein the wedge has a length which is less than about five times a diameter of the rod.

8. The joint of claim 1, wherein the rod is solid except at said opening.

9. The joint of claim 1, further comprising a plug which is screwed into the fitting such that the plug is positioned adjacent the end of the rod.

10. A joint, comprising:
    a generally solid rod which is inserted into a fitting, the fitting being formed of a single piece of metal and having a metal inside surface,
    the rod having an exterior surface and a slit, the slit being inside the rod,
    a wedge being inserted into the slit, the wedge configured to force the slit open and expand the rod outward by being provided in solid form, and
    a layer of adhesive material substantially equal thickness located between the exterior surface of the rod and the inside surface of the fitting,
    wherein the metal inside surface has an inner contour which varies smoothly and nonlinearly with distance along the fitting, and
    wherein the wedge has a dimension which has an outer curvature similar to said inner contour, wherein the wedge tightly engages the rod, and wherein the exterior surface of the rod tightly presses toward the inside surface of the fitting via the layer of adhesive material sandwiched therebetween, wherein the exterior surface of the rod substantially conforms to the inside surface of the fitting, and wherein there is not less than 0.007 inches between the interior surface of the fitting and the exterior surface of the rod.

11. The joint of claim 10, wherein said wedge and said fitting are made from metal and said rod is made from non-metallic material.

12. The joint of claim 10, wherein said layer of adhesive material further comprises non-adhesive, uncompressible elements that are between 0 and 0.02 inches in diameter.

13. The joint of claim 12, wherein the wedge has a length which is less than about five times a diameter of said rod.

14. A joint, comprising:
    a generally solid rod defined by an outer surface, said rod inserted into a fitting, the fitting being formed of a single piece of metal, said fitting defined by an internal bore having an inside surface of metal which varies smoothly and nonlinearly with distance along the fitting, the cross-sectional shape of said inside surface defining a first contour, said first contour defined by a narrow end and an opposing wide end;
    the rod having a slit, the slit being inside the rod;
    a wedge being inserted into the slit, said wedge defined by at least two outwardly-facing surfaces of matching shape, said shape of said outwardly-facing surfaces matching said first contour; and an adhesive layer of substantially consistent thickness and of not less than 0.007 inches in thickness between said rod outer surface and said bore inside surface.

15. The joint of claim 14, wherein said wedge comprises four outwardly-facing surfaces of matching shape aligned in a cruciform shape.

16. The joint of claim 14, defining a gap between said wedge outwardly-facing surfaces and said fitting inside surface, wherein the thickness of said gap is substantially consistent between said narrow end and said wide end of said fitting, and wherein the adhesive layer fills said gap.

17. The joint of claim 16, wherein said adhesive layer is comprised of a mixture of adhesive material and non-adhesive material, said non-adhesive material comprising non-compressible solid forms defined by diameters of between 0 and 0.02 inches in diameter, said non-adhesive maternal serving to ensure said gap.

18. The joint of claim 14, wherein said wedge is positioned within said fitting such that said narrow ends and said wide ends are aligned in relative juxtaposition.

\* \* \* \* \*